Eissfeldt & Thumb,
Manf Bone Black.
No. 113,279. Patented Apr. 4, 1871.
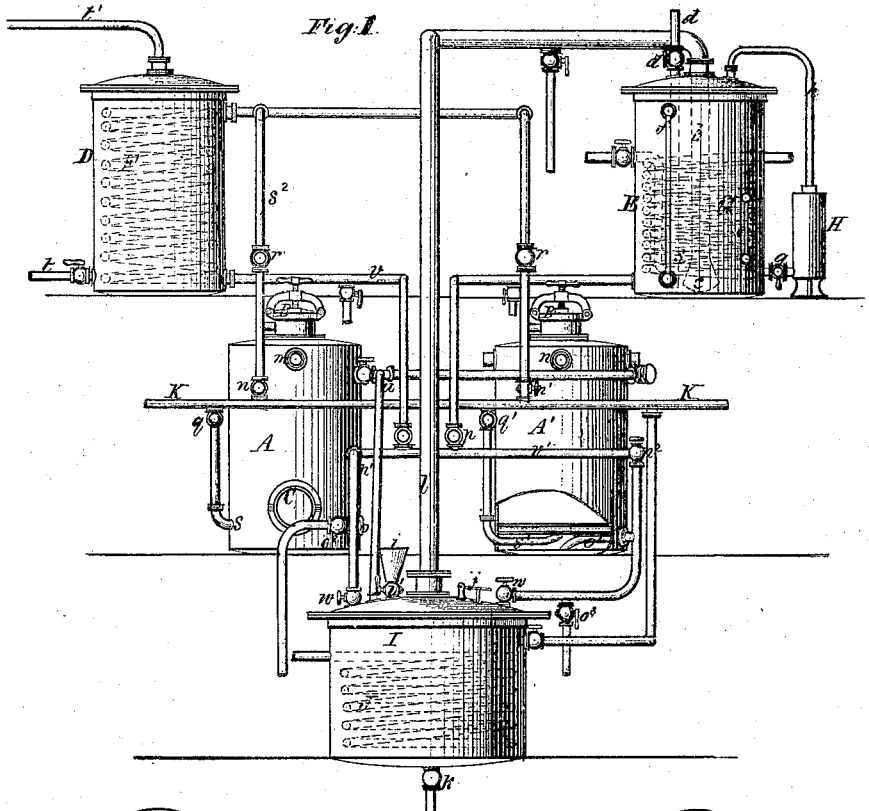
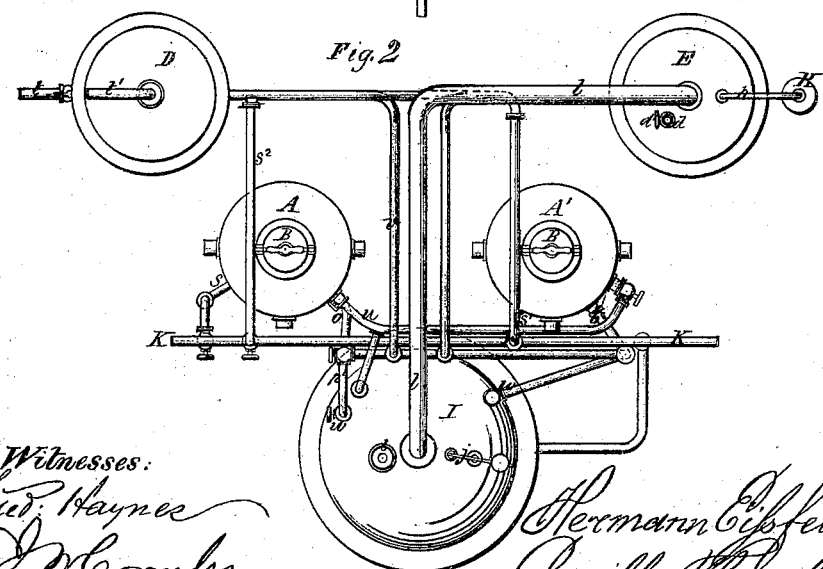
Witnesses:
Fred. Haynes
J. W. Coombs
Hermann Eissfeldt
Camillo Thumb
per Brown Coombs &c
Attorneys

United States Patent Office.

HERMANN EISSFELDT, OF SOLLINGEN, DUCHY OF BRUNSWICK, AND CAMILLO THUMB, OF MAGDEBURG, PRUSSIA.

Letters Patent No. 113,279, dated April 4, 1871.

IMPROVEMENT IN PURIFYING ANIMAL CHARCOAL.

The Schedule referred to in these Letters Patent and making part of the same.

*To all whom it may concern:*

Be it known that we, Dr. HERMANN EISSFELDT, of Sollingen, in the Duchy of Brunswick, Germany, and CAMILLO THUMB, of Magdeburg, in the Kingdom of Prussia, have invented a new and useful Improvement in the Process of Revivifying Animal Charcoal; and we do hereby declare that the following is a full, clear, and exact description of the same, reference being had to the accompanying drawing forming part of this specification, in which—

Figure 1 is a front elevation of the apparatus constructed in accordance with our invention, showing one of the vessels partly in section.

Figure 2 is a plan of the same corresponding with fig. 1.

Similar letters of reference indicate corresponding parts.

This invention is designed to effect that part of the revivifying process commonly effected by burning, and its object is to complete the revivification more economically and with less waste.

It consists in the treatment of the charcoal with concentrated ammonia, and in an apparatus of novel character for effecting such treatment.

To enable others to carry out our invention we will proceed to describe the same with reference to the drawing.

A A' are cylindrical cooking vessels, of a construction and size similar to each other, which are placed upright and on a level with each other on a proper platform; these vessels are closed at their bottoms, but are provided with openings or man-holes B B' in their tops, having tight covers secured in the ordinary way.

Within these vessels two false bottoms are arranged at a certain distance from each other. These false bottoms may be made of sheet-iron and in several parts, so that they can be taken out conveniently through the openings or man-holes C C' formed in the sides of the vessels A A'.

Between these false bottoms screens $a\ a$ are arranged.

D E are condensing vessels, made preferably of cylindrical form, and provided with tight covers. These condensing vessels are placed upright on a platform elevated and to one side of vessels A A'.

Within the vessel D a coiled pipe or worm, F, is arranged, reaching nearly from top to bottom, both ends, the upper and lower one, passing through the side of the vessel to connect with pipes, that will be described hereafter.

The vessel E also has a worm, G, arranged within it, both ends of which are passed through the side of the vessel at an equal distance from the bottom of the latter.

A central tube, $b$, is secured to the cover of the vessel E, extending downward close to the bottom of the same, where said tube is provided with a rose, $c$.

A water-pipe $d$, is also extended through the cover of the vessel E, to within a short distance of the bottom of the said vessel, and is provided above the cover with a cock, $d'$.

A thermometer, $e$, and a water-gauge, $f$, are arranged to the outside of the vessel. Close to the vessel E a cistern, H, is arranged on the same platform, both at the top and bottom, by means of pipes $g\ h$, of which the pipe $h$, that passes through the top of the cistern H, is extended nearly to the bottom of the latter.

I is a receiving vessel of proportionate size, arranged on a base below the platform, on which the vessels A A' are placed, and to one side of the latter. This vessel is provided with a tight cover, and has a steam-worm, J, arranged within it, both ends of which, the inlet and outlet, pass to the outside of the vessel.

On top of the cover of the vessel I a hopper, $i$, having a valve, $i'$, and a safety-valve, $j$, opening inwardly, are arranged.

To the bottom of the vessel a discharge-cock, $k$, is secured, and with the tops of the former a steam-pipe, $l$, is connected, which passes upward to connect with the central steam-pipe $b$ of the vessel E.

The operation is as follows:

The charcoal having been treated with soda and then washed and evaporated, as is ordinarily done before burning, is placed into the vessels A A' through the upper man-holes B B', up to within about two inches of the peeping-holes $m\ m$; when the man-holes are tightly closed, steam is admitted to the vessels A A' by opening the cocks $n\ n$, which establish communication between the upper parts of the vessels A A' and a steam-pipe, K. This is done for the purpose of expelling the water contained in said vessel through the pipes $o\ o^1$, the discharge-pipes $o^2 o^3$ being also open. This being accomplished, said cocks are closed and the cocks $p\ p^1\ p^2$ are opened, which permits the ammoniacal liquid contained in the condensing vessel E to flow in the vessels A A'. When the liquid has risen to the level of the charcoal contained in said vessels, or a little above it, which can be observed through the peep-holes, those cocks are closed and the cocks $q\ q'$ and $r\ r'$ are opened, whereby steam is allowed to pass from the steam-pipe K through the pipes $s\ s^1$ into the vessels A A', just below the perforated false bottoms in said vessels, and the cooking process commences; at the same time steam is allowed to pass up through the pipe $s^2$ into the worm F, arranged in the condensing vessel D, whereby said steam is condensed, cold water being allowed to flow continually through the vessel D by means of the pipe t, that being the inlet-pipe, and pipe t' being the outlet-pipe. In consequence of the condensation of steam in the worm F, the liquid in the vessels A A' will rise until it is able to pass out through the pipe u into the receiving vessel I, the products of condensation being allowed to return through the pipes v v' into the vessels A A'. This boiling process is continued for about one hour, when the liquid contained in the vessels A A' is entirely discharged into the receiving vessel I by opening the cocks w w, and the charcoal can be discharged through the man-holes C C'.

The ammoniaical liquid contained in the condensing vessel E consists of distilled water having absorbed two per cent. of ammonia.

The restitution of ammonia is obtained by pouring lime-water through the hopper into the receiving vessel I, thus setting free ammonia, which is evaporated by means of the steam-worm J, and condensed and absorbed by the water contained in the condensing vessel E. The cistern H serves to hold all unabsorbed vapors, and serves to provide against a too great pressure in the vessel E.

The cooking of the animal charcoal with the ammoniacal liquid and the restitution of ammonia are repeated until the charcoal is completely cleaned. The charcoal is then washed with distilled water, when it is ready to be used again.

What is here claimed, and desired to be secured by Letters Patent, is—

1. The treatment of animal charcoal in the process of revivification with concentrated ammonia, at the time and in the manner substantially as and for the purpose herein described.

2. The combination and arrangement of the cooking vessels A A', condensing vessels D E, and receiving vessel I, and their several contained worms and connections, the whole operating substantially as and for the purpose herein specified.

DR. HERMANN EISSFELDT.
CAMILLO THUMB.

Witnesses:
PETER BARTHEL,
FRANZ WIRTH.